Oct. 1, 1968  D. A. JONES  3,404,254
METHOD AND APPARATUS FOR ENGRAVING A GENERALLY
CROSS-SECTIONALLY CIRCULAR SHAPED BODY
BY A CORPUSCULAR BEAM
Filed Feb. 26, 1965  4 Sheets-Sheet 1
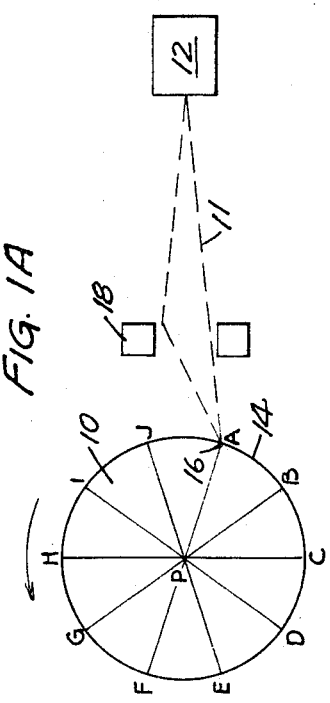
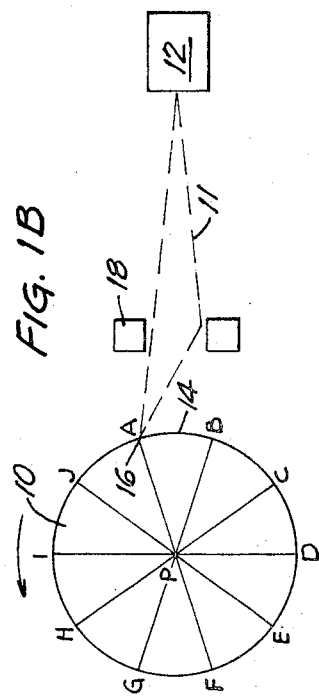
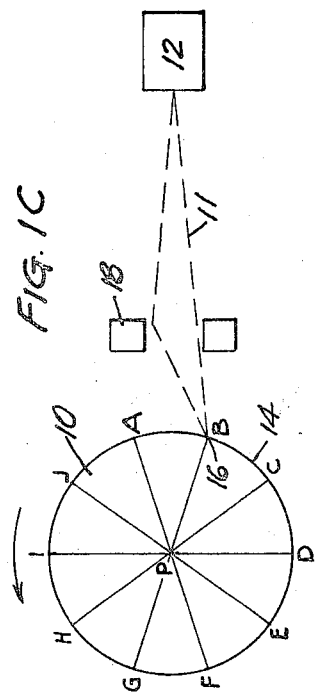
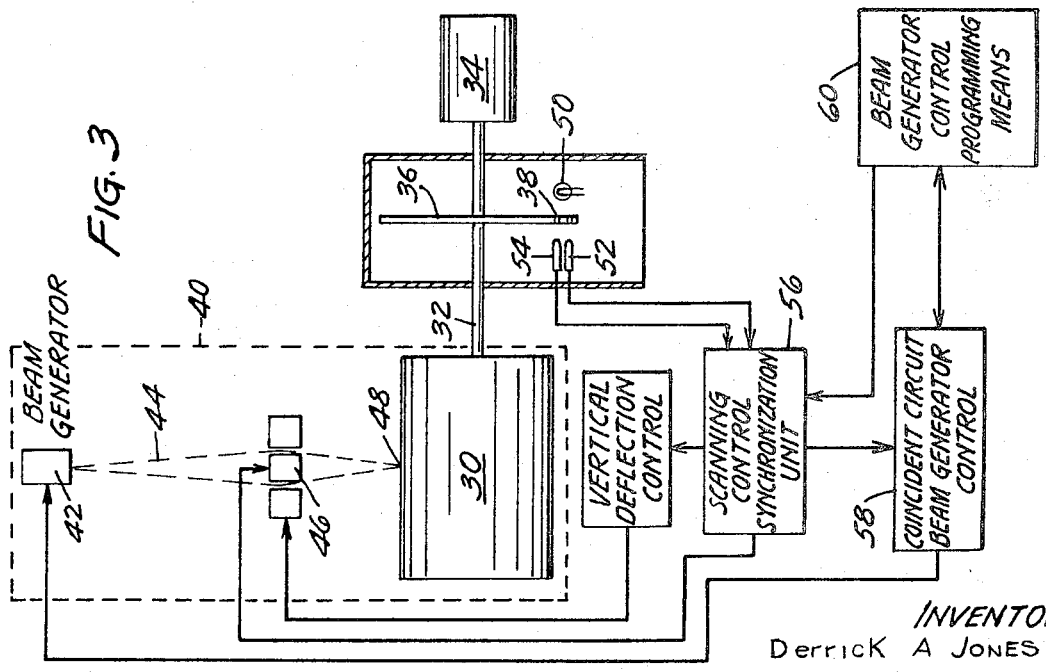
INVENTOR
Derrick A Jones
BY Carpenter, Kinney & Boulter
ATTORNEYS

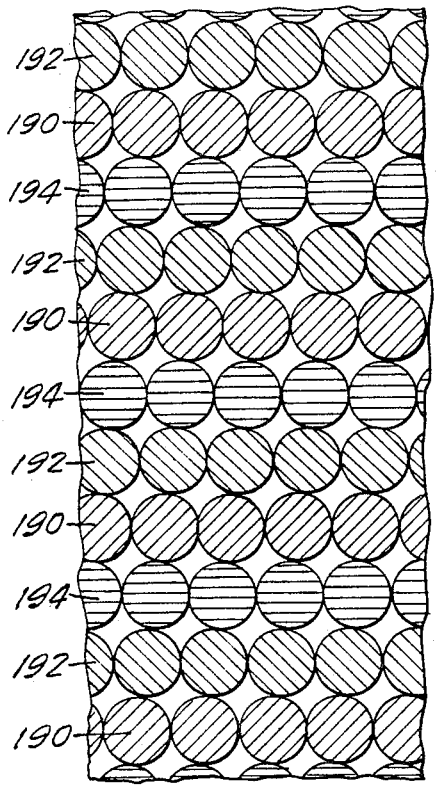
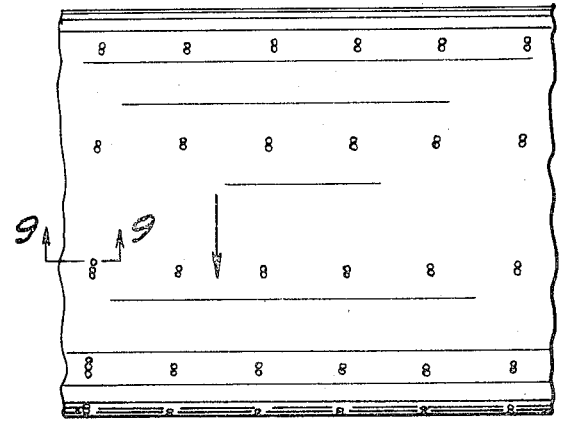
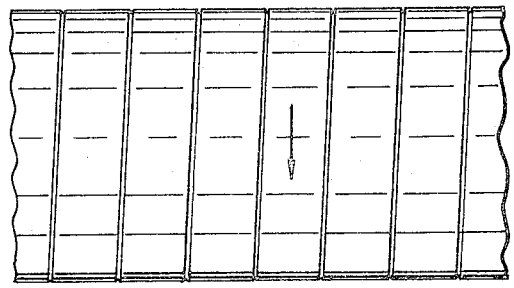
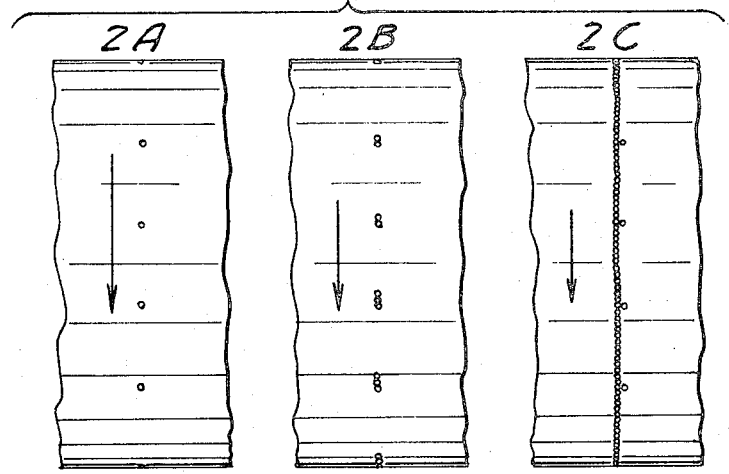
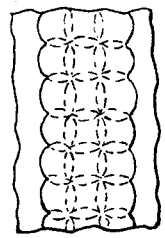

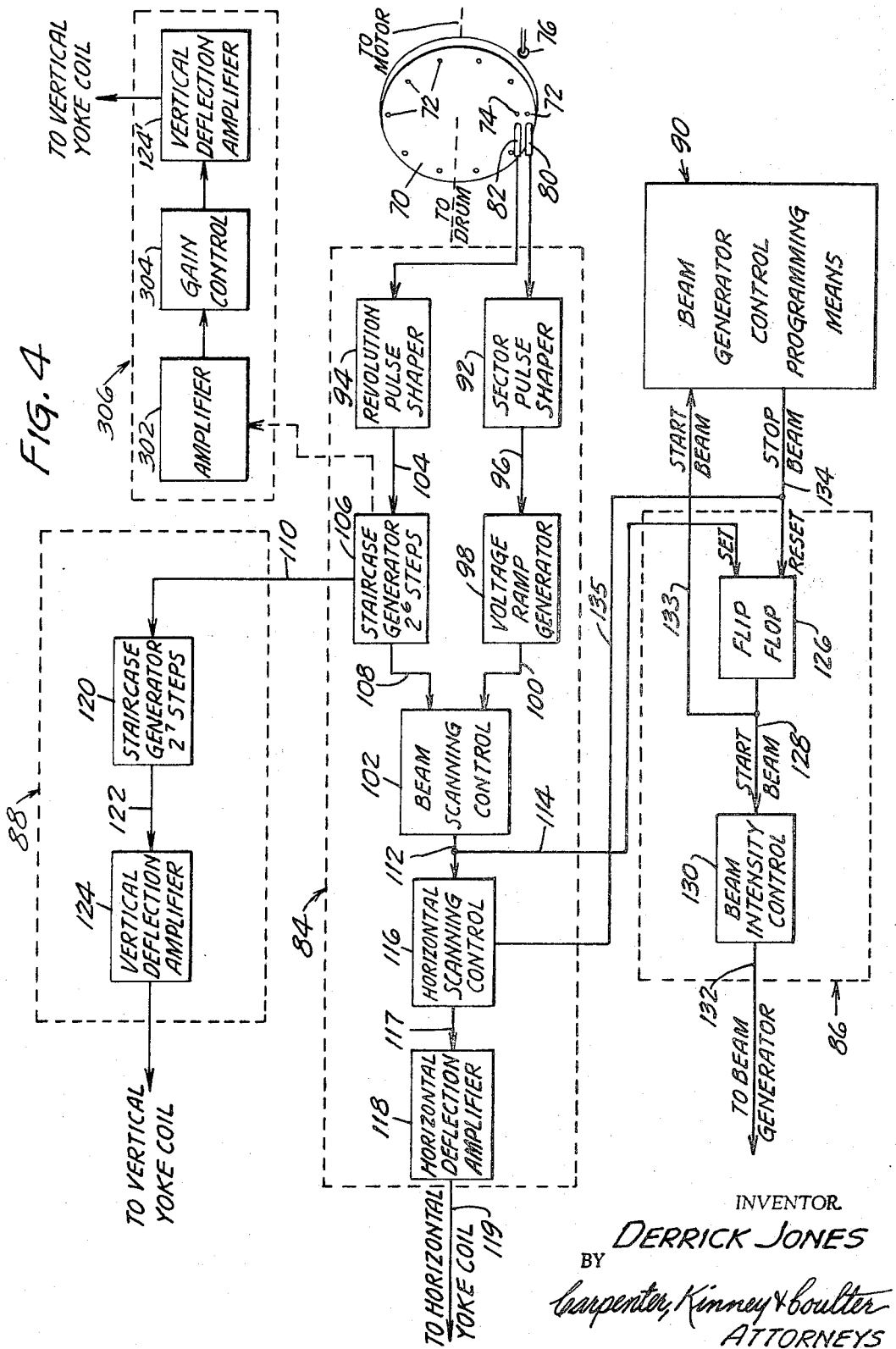

Oct. 1, 1968
D. A. JONES
3,404,254
METHOD AND APPARATUS FOR ENGRAVING A GENERALLY
CROSS-SECTIONALLY CIRCULAR SHAPED BODY
BY A CORPUSCULAR BEAM
Filed Feb. 26, 1965
4 Sheets—Sheet 4
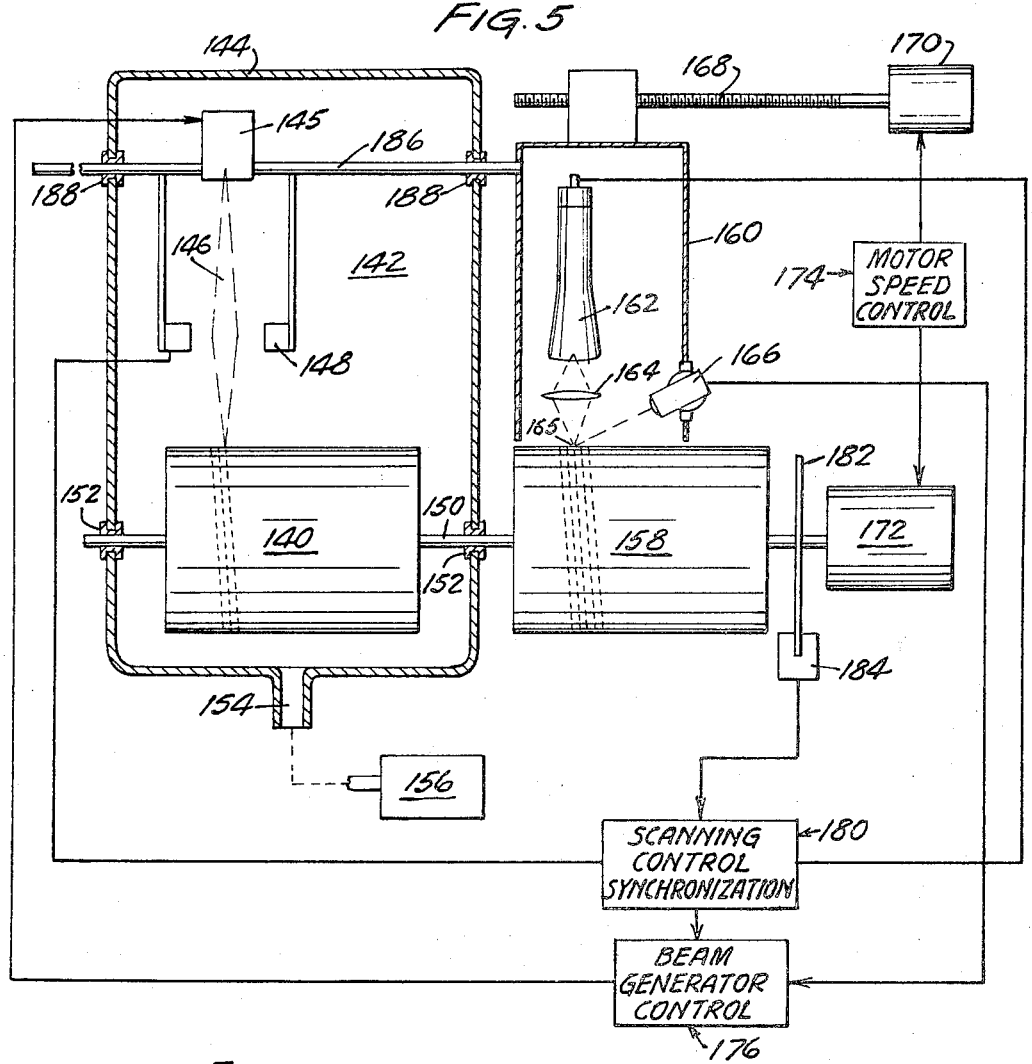
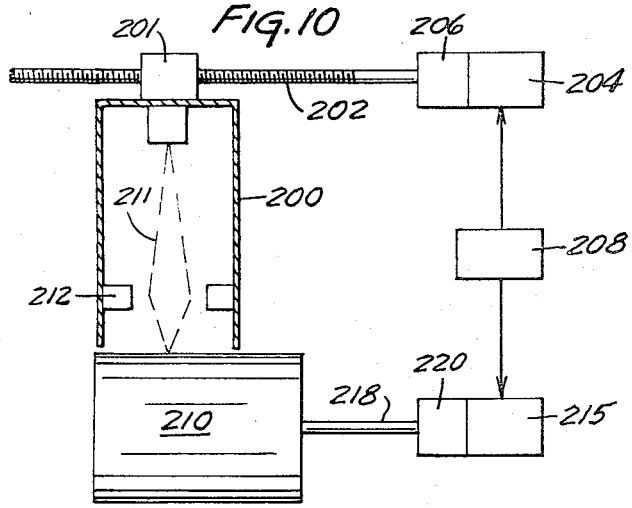
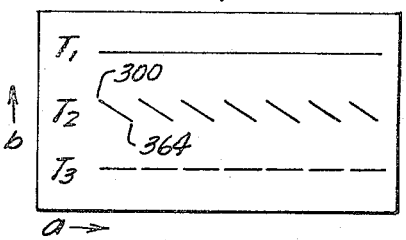
INVENTOR.
DERRICK JONES
BY
Carpenter, Kinney & Coulter
ATTORNEYS United States Patent Office 3,404,254
Patented Oct. 1, 1968

3,404,254
METHOD AND APPARATUS FOR ENGRAVING A GENERALLY CROSS-SECTIONALLY CIRCULAR SHAPED BODY BY A CORPUSCULAR BEAM
Derrick A. Jones, Somerset Township, St. Croix County, Wis., assignor to Minnesota Mining and Manufacturing Company, St. Paul, Minn., a corporation of Delaware
Filed Feb. 26, 1965, Ser. No. 435,555
7 Claims. (Cl. 219—121)

ABSTRACT OF THE DISCLOSURE

A method and apparatus are shown for engraving a generally cross-sectionally circularly shaped body with a corpuscular beam which melts localized portions of the body. The engraving apparatus includes means for directing the corpuscular beam at the body, means connected to and adapted for rotating the body along an axis while the corpuscular beam melts localized portions of the body and the body is rotated at a peripheral velocity sufficient to remove the melted localized portions from the body by centrifugal force, and a programming means positions the corpuscular beam at discrete positions on the body which maintains the body at the sufficient velocity to continually remove the melted body portions to produce an engraved body.

---

This invention relates to new and very useful equipment and methods for engraving surfaces.

More particularly, this invention is directed to an apparatus for engraving a body which during engraving has generally cross-sectionally circularly shaped peripheral surfaces which are capable of being locally selectively loosened upon the application thereto of sufficient localized high energy. The apparatus utilizes a means for rotating said body upon an axis at a velocity sufficient to remove by centrifugal force loosened local portions of said body, a means for controllably generating, modulating, and directing a beam of sufficient high energy against the rotating peripheral surfaces of such body to effect local loosening thereof, and means interconnecting said rotating means and said beam generating, modulating and directing means to maintain a predetermined programmed interrelationship therebetween. The invention further relates to methods using such apparatus to accomplish the desired engraving of the indicated body.

Heretofore, as those skilled in the art will appreciate, high energy beams, such as electron beams, have been used for welding and cutting of metal surfaces. In such prior art processes, the metal is maintained in a stationary position and the high energy is used to locally melt and vaporize selected portions of the metal. By the present invention there is provided a method and means for substantially reducing the amount of energy required to remove a unit volume of material, such as metal, by means of such a high energy beam. Such method and means utilizes both a controlled high energy beam and centrifugal force.

It is accordingly an object of the present invention to provide a method and means for engraving curved surfaces using a high energy beam and centrifugal force.

Another object of this invention is to provide a method and means for engraving surfaces of curved materials so as to produce a predetermined surface typography thereon using electronically coded digital information to control the rate and position of engraving and further using centrifugal force to remove loosened localized portions of such surfaces being engraved.

Another object of this invention is to provide method and means for die sinking and/or machining of cylindrical surfaces using a high energy beam and centrifugal force.

Another object of the present invention is to provide method and means for engraving metallic arcuate surfaces, especially cross-sectionally circular surfaces of the type used in the production of letter-press cylinders, using a scanning electron beam and means for causing such arcuate surfaces to rotate.

Another object of this invention is to provide apparatus useful for the preparation of cylindrical metal letter-press printing plates using a rotating cylindrical metal plate and an electron beam adapted to be so controlled that the relative instantaneous beam intensity and velocity of movement between the beam and the surface of the cylindrical plate are such as to permit the removal of predetermined portions of the surface of such metal body.

Another object of this invention is to provide an engraving apparatus including a source of and means for controlling a beam of high intensity energy, means for imparting to a curved surface to be engraved a constant velocity of rotation, and means for maintaining a velocity interrelationship between the beam and a prechosen region of such curved rotating surface to engrave such prechosen region.

Another object of this invention is to provide an engraving apparatus including means affording a controlled beam of high intensity energy, means for imparting to a curved surface to be engraved a predetermined velocity of rotation, and means for selectively controlling the point of beam incidence on such curved surface to afford the desired engraving.

Another object of this invention is to provide in an apparatus of the type indicated an electron beam which is of relatively constant intensity but whose residence time upon such rotating curved surface is adapted to be controlled and varied in a predetermined manner.

Another object of this invention is to provide in an apparatus of the type indicated an electron beam which is of variable but controlled intensity but whose residence time upon such rotating curved surface is fixed.

Another object of this invention is to provide a method for engraving a rotating curved surface comprising circumferentially moving a beam of high intensity focused energy over prechosen regions of such curved surface while maintaining such an interrelationship between said beam and said prechosen regions that the intensity and residence time of said beam on a particular point of said curved surface is sufficient to initiate local disintegration (or melting) and removal of material from said curved surface at such point.

Another object of this invention is to provide an apparatus including a source for a beam of a continuous but variable high intensity energy, means for imparting to a curved surface to be engraved a constant velocity of rotation, and means for maintaining a programmed interrelationship between the beam and a curved rotating surface, such that the beam can continuously loosen preselected portions of such surface and the velocity of rotation is such as to remove such portions by centrifugal force.

The invention is better understood by reference to the attached drawings wherein:

FIGURES 1A, 1B and 1C are diagrammatic views illustrating sequentially one mode of practicing the present invention;

FIGURE 2 is a diagrammatic view illustrating sequentially the engraving of a curved surface in accordance with one teaching of this invention;

FIGURE 3 is a diagrammatic view of one embodiment of apparatus of the present invention;

FIGURE 4 is a block diagram of suitable circuitry for accomplishing a predetermined programmed interrelationship between a rotating body and control means for a beam of high energy;

FIGURE 5 is a diagrammatic view of another embodiment of apparatus of the present invention;

FIGURE 6 shows a diagrammatic view similar to FIGURE 2 but illustrating another manner of engraving a curved surface in accordance with another teaching of this invention;

FIGURE 7 is a highly magnified diagrammatic view of a curved surface which has been engraved in the manner illustrated in FIGURE 6;

FIGURE 8 is a diagrammatic view similar to FIGURE 6 illustrating a further manner of engraving a curved surface in accordance with the present invention;

FIGURE 9 is an enlarged diagrammatic sectional view taken along line 9—9 of FIGURE 6 and illustrating a typical engraved crater produced in a body in accordance with the present invention;

FIGURE 10 is a partial view of a modified form of the apparatus illustrated in FIGURE 3;

FIGURE 11 is an enlarged diagrammatic top plan view illustrating an engraved area produced on a surface in accordance with the present invention; and FIGURE 12 graphically illustrates skew.

This invention employs a beam of high intensity focused energy. Such a beam can be of any convenient type such as an electron beam, a laser beam, a proton beam, an ion beam, a beam of ultra high frequency radio waves or the like. A preferred type of beam and one which is used for illustrative purposes herein is an electron beam.

Such beams can be produced by any conventional mechanism or source means, for example, an electron beam generator or gun. As those skilled in the art will appreciate, an electron gun produces an electron beam. Preferably electron guns used in the apparatus and method of this invention are capable of controlling, focusing and reflecting a columnated beam of electrons. As electron gun construction is well known to those of ordinary skill in the art and comprises no novel portion of the present invention, a detailed description thereof is not given herein.

In general, the mechanism used to generate the beam includes means for moving said beam circumferentially over the curved surface to be engraved. This means additionally has the capacity to move the beam over prechosen portions of such circumferential surface. In the case of an electron gun, one suitable means for achieving such circumferential movement comprises electromagnetic focusing coils, electrostatic deflection plates or yokes.

The surface to be engraved in accordance with the invention is curved and composed of a material capable of being locally degraded. More specifically, this curved surface has surface characteristics which make it capable of selective disintegration upon the application of localized high energy, especially heat. One suitable material is metal, or metal alloy, especially type metal which is used in the manufacture of printing cylinders.

Preferably, the surface during engraving is cylindrical and is rotated upon its axis and its axis is fixed. Also the surface to be engraved should be supported so as not to be affected by centrifugal and centripetal forces during rotation.

The apparatus and method of this invention require the use of means for imparting to the curved surface a constant velocity of rotation. Thus, in the case where the curved surface is cylindrical, such means can merely involve the use of shaft means axially connected with such curved surface. This shaft is then journalled and rotated by an appropriate power head such as an electric motor. The power head is usually so chosen as to be capable of rotating the curved surface at a relatively constant velocity of rotation at a suitable r.p.m. (revolutions per minute), as hereinafter explained.

The apparatus and method of this invention require means for maintaining a velocity interrelationship between the beam and a prechosen region of the curved surface being etched such that the residence time of the beam on any point of said curved surface within the prechosen region is sufficient to initiate selective local disintegration of a volume of the curved surface. This means in effect synchronizes the instantaneous angular position of the curved surface and the pattern of information or the like being etched upon the curved surface. Such pattern usually is in the form of an image.

One such means involves the use of optical interception means such as a disc mounted upon a shaft used to rotate a cylindrical curved surface being etched. The disc is divided on its circumferential regions at regular intervals. These intervals are adapted to intercept a fixed light beam and the resulting interrupted light beam is incident on a photocell and is thereby used to fix the position of the scanning beam upon the surface of the cylinder during an etching operation.

Another such means involves a cam mechanism functionally interconnected with the shaft producing rotation of the curved surface being etched. The cam actuates a contact or the like which makes or breaks, as the case may be, a circuit controlling a beam. The beam, of course, has sufficient energy to achieve the desired selective disintegration of the curved surface.

Another such means involves the use of an insulated disc upon which have been placed suitable circumferentially spaced, peripherally located, electrically conductive areas. Coupled with the insulated disc is an electrically conductive wiper element which is fixed and alternately passes over conductive and non-conductive portions of such disc as it rotates at its axis. The output electric signal positions sectors of the rotating body.

Another such means is to use a disc mounted upon the shaft used to rotate a cylindrical surface to be etched. The disc bears on its circumferential portions electrodes which sequentially come into proximity with one or more stationary electrodes. This technique is comparable to the spark gap synchronization system used in the ignition system of early automobiles.

Another such means involves the use of an electromagnet. In this method a disc is mounted upon a shaft used to make the cylindrical surface to be etched rotate. The rotation of the disc between the poles of a suitably designed electromagnet creates a weak electric current in the magnet. Variations in the field cause variations in the amount of current produced. The variations in the amount of electric current energy produced can be controlled by any conventional means such as, for example, by the interrupting of the cylindrical regions of the disc with regular spaced intervals wherein a different type of magnetically susceptible material has been substituted in the etched portions of this disc.

Another such means involves the use of capacitative techniques where a rotating disc is coupled to a stationary plate and variations in the capacitative effects between the two plates are used to control the angular position of the cylindrical plate.

Another such means involves the use of a synchronous motor. This means is different from those immediately above described in that here, contrary to the systems above described, it is not the power head for rotating the curved surface which controls the system, but extraneously generated electric "clock" pulses which control synchronous motor operation (rotation).

The various elements used in the construction of apparatus useful in this invention are mounted upon an appropriate framework so as to maintain the proper operational relationship to one another. This framework can be constructed of any conventional material and made for any special characteristics though, of course, it is desirable to have a stable sturdy frame construction.

Briefly, there appear to be two separate modes in which the present invention can be practiced. In one, there may be no relative motion between the beam and a prechosen spot on a moving arcuate surface for a predetermined period of time. In the other, there is always relative motion between the beam and the rotating surface being engraved, so that there is in effect no prechosen spot. The amount of material removed in this second mode is determined by two factors: (a) the velocity of relative movement between the beam and the surface being engraved, and (b) the instantaneous modulation or beam intensity. A combination of (a) and (b) can be used. The invention will now be described in reference to the first mode.

When using a continuous scanning beam and a rotating cylinder, the cylinder can be biased to temperatures just under its surface melting point. Also, one can employ for the cylinder surface a material which requires a small (relatively) amount of energy per unit area of surface to produce local disintegration (melting) thereof. It is usually convenient to employ as the continuously scanning beam one having sufficient energy per unit area to effect the desired engraving on the rotating surface.

Referring to FIGURE 1, parts (A), (B) and (C), there is seen a vertical sectional view through a metallic cylinder 10 which is to be engraved in accordance with the teachings of this invention. Focused on the surface of the cylinder 10 is an electron beam 11 which is generated by an electron gun 12 and which is focused and deflected circumferentially of cylinder 10 by means of coils 18. The same numbers are used on corresponding elements of the diagrams shown in parts A, B and C of FIGURE 1.

The cylinder 10 is divided into a series of 10 segments or pie-shaped pieces, the radial edges of the segments being labeled alphabetically as shown.

The cylinder 10 is rotating at a r.p.m. sufficient to cause any molten metal on the surface thereof to be removed by centrifugal force. The speed of rotation will, of course, be dependent upon a number of variables, as those of ordinary skill in the art will readily appreciate. For example, a cylinder of large diameter can be rotated at a slower r.p.m. and still achieve the same surface velocity as a cylinder of smaller diameter. Also, the material of which the surface of the cylinder is constructed will affect the desired r.p.m. The actual theoretical force required to remove a unit volume of metal from a smooth, curved metallic surface is determined by a number of very complex variables. These variables are so interrelated that it is impractical to give a single set of parameters to permit theoretically calculating such values for each individual situation which can be postulated. However, the angular speed necessary to achieve throw-off of molten material can readily be determined merely by melting a localized portion of the surface and gradually increasing the r.p.m. of a metal until the desired throw-off is achieved in any individual installation. As a matter of convenience, it has been found that for a type metal cylinder of, say, 6 inches in diameter, a r.p.m. of even as low as about 1500 is suitable for throw-off of molten type metal.

In the FIGURE 1 embodiment, it will be appreciated that the number of segments into which the cylinder is divided is more or less arbitrary although it will be appreciated that the maximum number of degrees in a segment will be a number which is constant and is chosen from a consideration of the equipment which is being employed, the fidelity or quality of the image to be formed on the cylinder compared to an original or master and a number of other factors. Here, each of the 10 segments occupies approximately 36°.

When the beam 11 is in a starting position, it is focused and deflected by coils 18 so as to strike the leading edge of a segment 14. The scan rate of beam 11 is so chosen as to make the focused point 16 of the beam 11 appear to remain stationary on the surface of the cylinder 10. Thus, as the cylinder 10 rotates in a counter-clockwise direction, the point 16 of beam 11 appears to remain stationary at point A on the cylinder 10 in FIGURE 1. This attitude is maintained in this illustration until the cylinder rotates through a full 36°, that is, until the attitude of point A on the cylinder and point 16 on the beam have changed to the relative positions shown in FIGURE 1B. (The attitude need not be maintained for a full 36°; see description below.) During the time when the beam 11 thus remains stationary on the surface of the cylinder 10, the intensity of the beam is so chosen that a predetermined quantity of metal on the surface of the cylinder 10 is melted. Since the r.p.m. or speed of revolution of the cylinder 10 has been prechosen so as to effect removal of molten metal on the surface thereof, metal melted by the beam 11 during its residence time at point A is promptly removed so that when the beam and cylinder are in their relative positions as shown in FIGURE 1B, there is a single, crater-like hole, generally cross-sectionally circular (assuming a cross-sectional circular beam is used), left on the surface of the cylinder 10.

At this point the beam 11 is shut off and the field or coil 18 is changed so that the field therein matches that applied to the beam initially as shown in FIGURE 1A. Then, the beam 11 is turned on so that the coil 18 causes the beam to focus substantially on the segment which begins at B.

Naturally, there is a time lag here for beam fly back. The fly back time usually can be measured in microseconds whereas the cylinder 10 rotation time can usually be measured in milliseconds. In a preferred mode of operation, the time lag for beam fly back is so controlled as to completely remove a volume of metal as shown in FIGURE 1l. In FIGURE 1l the distance between adjoining crater-like holes is deliberately chosen so as to be less than one beam diameter (i.e. less than one crater diameter). The resulting overlap between beam spots and craters produced thereby not only compensates for the time lag of beam fly back but also tends to produce smooth edges and sharp definitions in the resulting engraving.

As a result, when the cylinder 10 has rotated through 360°, it has ten dots (little craters) formed therein in a track. This track can typically be either circular or spiral. The appearance of a circular track for an expanded hemisphere is shown in FIGURE 2A.

FIGURE 3 shows one embodiment of an apparatus construction of this invention. Here the cylinder 30 is mounted on a shaft 32 (journaling means not shown). Shaft 32 is driven or rotated by power head 34 (e.g. a drive motor or the like). Positioned in this embodiment intermediate between the cylinder 30 and the drive motor 34 is a rotating disc 36. This disc has a plurality of regularly spaced circumferentially positioned but axially extending holes, for example, ten holes each spaced in an interval of 36° between centers. In addition in this embodiment there is conveniently an eleventh hole spaced on a different circumference (shorter radius) of the disc 36; this 11th hole is designated in FIGURE 3 conveniently by the numeral 38. (Only one of the other 10 holes in disc 36 is shown in FIGURE 3.)

Positioned generally transversely with respect to the axis of cylinder 30 over the arcuate surface of cylinder 30 is a high energy beam generating and controlling apparatus, in this case an electron gun assembly herein designated in its entirety by the numeral 40. This gun 40 is equipped with a beam generator 42 which can conveniently and conventionally comprise a cathode, a grid, and an anode (all not shown). This gun 40 produces a beam 44 which passes through a combined focusing and deflecting yoke assembly designated in its entirety by the numeral 46. After passing therethrough the beam 44 arrives at the surface of the cylinder 30 as a point 48. The beam is typically about 10 mils or the like in diameter.

The rotation of the cylinder 30 is chosen, as explained above, so that the centrifugal force generated at the surface is sufficient to remove therefrom any melted material thereon derived from the beam impinging on the surface of the drum. The energy and scan rate associated with the electron beam 44 are so chosen as to cause the beam point 48 to melt selected and predetermined portions of the surface of the cylinder 30. Suitable means are provided for interconnecting and synchronizing the rotation of the cylinder 30 with the operation of the electron beam 44.

In this embodiment means are provided so the beam 44 is caused to track the cylinder 30 in circumferential but axially spaced tracks (i.e. circularly). When the electron beam has completed its operations on a given circumferential track, it is stepped to an adjacent track whereupon the entire sequence of operations is repeated for the new or second track. This sequence is continued until the entire cylinder 30 is engraved with a predetermined pattern.

Those skilled in the art will appreciate that it is important to this embodiment that the beam scan rate be synchronized with the surface velocity of the cylinder 30 at the point 48 of impact of the beam 44, all as described above diagrammatically in reference to FIGURES 1A, 1B, 1C and 2A. In this embodiment, such synchronism is obtained (or achieved) by the afore-referenced rotating disc 36. Disposed in axial spaced relationship near one edge or perimeter of the disc 36 is a light source 50. Aligned with the light source 50 are a pair of photosensitive cell devices 52 and 54 respectively. The cell 52 senses the outermost circumferentially spaced holes in disc 36 and thereby records the angular position of sectors. The other cell 54, detects the number of rotations of cylinder 30 (i.e. by detecting the passing of hole 38) so as to permit axial stepwise advance of the electron beam from one circumferential rotation to another as more particularly hereinafter explained. The output from both photosensitive devices is fed to a scanning control synchronization unit 56.

The basic function of the scanning control synchronization unit 56 is to take the otuput from photocells 52 and 54 and control the scanning characteristics of the electron beam 44. In this embodiment the electron beam 44 is chosen so as to have a constant intensity and the synchronization unit 56 serves to determine the time in a given scan that the beam 44 remains in contact with a point in a sector of the cylinder 30. The synchronization unit 56, in other words, synchronizes the scanning rate of the beam 44 with the angular position of the surface of cylinder 30 such that the beam point 48 remains in contact with a prechosen point on the surface of the cylinder 30 for a prechosen interval of time.

The synchronization unit 56 controls the scanning rate of the electron beam 44 such that the point 48 scans the periphery of the rotating cylinder 30 at a rate equal to the peripheral velocity of the cylinder 30 such that the point 48 remains fixed during the time that the electron beam 44 is in the on position. During the time that the electron beam point 48 is in contact on the surface of the cylinder 30 this spot is heated sufficiently by the electron beam 44 so as to melt locally.

The synchronization unit 56 is connected to the coincident circuit beam generator control 58. The beam generator control 58 performs the function of coordinating the off-on condition of the beam with a beam generator control programming means 60. The coincident beam generator control circuit 58 receives an on signal from the synchronization unit 56 and transmits to the programming means 60 that the beam is in the "on" position. The programming means 60 communicates with the beam generator control 58 to terminate the beam at the appropriate point and the programming means 60 includes means for controlling when the beam is to be shut off. The beam generator control 58 controls the beam generator 42 to turn the beam to either the off or on condition. Additionally, the beam generator control programming means 60 communicates with scanning control synchronization unit 56 to command the scanning control to return the electron beam to its quiescent state.

Referring to FIGURE 2, one can appreciate how the apparatus of FIGURE 3 operates. The scanning control synchronization unit during one revolution produces a series of crater-like dots or holes as shown in FIGURE 2A. During the second revolution the scanning control synchronization unit steps the vertical deflection control so that a second sequence of crater-like holes are created. The center of each such hole in this second sequence is spaced from the center of each adjacent crater-like hole by a distance approximately equal to one hole diameter. Conveniently, a step generator is employed for this purpose. The view shown in FIGURE 2B indicates that the cylinder has undergone two revolutions and is now engaged in a third revolution so that there are three adjoining dots in the lower half of FIGURE 2B while there are only two in the upper half of FIGURE 2B indicating that the beam is about to create a third crater-like dot adjacent the three already formed with the surface rotating in the direction indicated.

In FIGURE 2C is shown what happens when one complete circumferential row is completed. Here a step generator has simply caused the beam to act upon another circumference, this circumference being disposed from the first circumference by a distance equal approximately to one beam spot diameter so that when the second circumference is completely filled in the manner indicated, a third circumferential scanning sequence can be commenced.

One embodiment of a suitable electronic system is illustrated in greater detail by FIGURE 4. Those skilled in the art will appreciate that other means for interconnecting the rotating means and the means for controllably generating, modulating, directing, etc., a beam can be employed to accomplish an equivalent result, including mechanical systems, electromechanical systems, and the like. Considering FIGURE 4, there is shown a disc 70 corresponding to disc 36 described above, disposed intermediate the driving motor 34 and rotating cylinder 30 of FIGURE 3. The rotating disc 70 has a plurality of holes, indicated generally as 72, around its periphery. The number of holes in the periphery are predetermined, for example 10, and each sector between the holes has an equal predetermined arcuate sector length of 36°. The holes 72 may be generally referred to as pulse sector holes. Disposed radially inwardly toward the center of the disc 70 is a single revolution pulse hole 74.

On one side of the rotating disc 70 is a light source shown generally as 76. On the other side of the rotating disc 70 are two photosensitive devices shown as 80 and 82. Photosensitive device 80 is disposed adjacent to the periphery of the disc 70 such that light passes through any one of the pulse sector holes 72 being in alignment therewith and the light source 76. In accordance with the above example, the disc 70 has ten pulse sector holes thereby permitting light to impinge on the photosensitive device 80 ten times in a single revolution. Similarly, the photosensitive device 82 is disposed adjacent to the revolution pulse hole 74 such that the light from light source 76 will impinge on the photosensitive device 82 when the revolution pulse hole 74 is in alignment therebetween. Revolution pulse hole 74 permits light from the light source 76 to impinge on the photosensitive device 82 only once in a single revolution of disc 70. In this description, a "track" has reference to one rotation of the surface being engraved through a full 360°. Similarly a "subtrack" or "sector" has reference to an arcuate distance circumferentially extending over the surface being engraved. Usually a track is equal to a plurality of generally equal subtracks; in this example, 10 subtracks equal one track.

Each of the photosensitive devices 80 and 82 applies its signal to the beam scanning synchronization unit 84, which unit was described previously in FIGURE 3. The synchronization unit 84 ultimately controls a coincident circuit beam generator control designated generally as 86, and a vertical deflection control noted generally as 88. The coincident circuit beam generator control 86 communicates with a beam generator programming means designated generally as 90. The output from the synchronization unit 84 ultimately controls the horizontal yoke coil of the electron beam device. The coincident circuit beam generator control 86 ultimately controls the beam generator of the electron beam device. The output of the vertical deflection control 88 ultimately controls the vertical yoke coil of the electron beam device and subsequently positions the beam onto a preselected track position.

The beam generator control programming means 90 generally communicates with the coincident beam generator control 86 and the beam scanning synchronization unit 84 to stop the operation of the beam generator and return the beam to its quiescent state at the appropriate time as will be described hereinafter.

Consider now the beam scanning synchronization unit 84. The output of the photosensitive device 80 is supplied to a sector pulse shaper 92 which shapes and amplifies a pulse received from the photosensitive device 80. Each pulse is generated when one of the pulse sector holes 72 permits light from the light source 76 to impinge on the photosensitive device 80. Generally, the output pulses from the photosensitive device 80 do not have a definite leading and trailing edge. Therefore, the sector pulse shaper 92 sharpens the leading and trailing edges of each pulse for use later on in the circuit.

Similarly, the photosensitive device 82 passes a pulse to the revolution pulse shaper 94 when the revolution pulse hole 74 permits light from the light source 76 to impinge on the photosensitive device 82. The function of the revolution pulse shaper 94 is similar to the sector pulse shaper 92, the only difference between the two pulse shapers being the number of pulses received and shaped per revolution of the disc 70. The output 96 from the sector pulse shaper 92 is supplied to a voltage ramp generator 98. The voltage ramp generator 98 receives the pulses from the sector pulse shaper 92 and generates a ramp voltage in response to the sector pulses received via output 96. The voltage ramp generator 98 applies a voltage ramp output via line 100 to a beam scanning control unit 102.

Concurrently, the revolution pulse shaper 94 applies a revolution pulse via line 104 to a staircase generator 106. The staircase generator 106 receives the revolution pulse, and in response thereto generates an output voltage of a predetermined level via its output line 108. The staircase generator 106 has a second output line 110 which applies a bi-level signal to the vertical deflection control 88 to indicae the completion of a stepping cycle of the staircase generator. The staircase generator 106 discretely and sharply raises the voltage level of its output pulse to a predetermined higher level in response to a revolution pulse received from the revolution pulse shaper 94 via line 104. The staircase generator 106 has a plurality of discrete voltage levels or steps, and, for purposes of example, the staircase generator 106 could, for example, have $2^6$ or 64 steps, the number of steps in such generator usually being equal to the number of spots (craters) created by the beam on a given subtrack in a given track. When the staircase generator 106 reaches its maximum count, it will automatically reset itself back to its lowest level or step to recount again thereby ending its cycle. The output line 108 from generator 106 applies the discrete levels to the beam scanning control 102. The beam scanning control 102 performs the function of selecting a particular spot of area on the periphery of the drum as a function of the revolution of the drum. Additionally, the control 102 synchronizes the scanning of the electron beam to the rotation of the drum such that the electron beam remains stationary relative to the particular spot on the periphery of the rotating drum thereby engraving that particular spot. This synchronism is obtained by using the sector pulses, which are representative of the revolutions per minute of the rotating drum to be etched, to control the electron beam scanning rate. The beam scanning control 102 via output 112 directly controls the horizontal scanning control 116. The horizontal scanning control 116 is coupled via line 117 to a horizontal deflection amplifier 118. The horizontal deflection amplifier 118 is connected via line 119 to the horizontal yoke coil of the electron beam device.

The beam scanning control 102 simultaneously applies its output to the coincident circuit beam generator control 86 via coincident control line 114 which is connected to output 112. The operation of the coincident control line 114 will be described hereinafter.

Considering now the operation of the vertical deflection control 88, the vertical deflection control 88 receives an output 110 from the staircase generator 106 of the beam scanning synchronization unit 84, output 110 applies a bi-level voltage from the staircase generator 106 to a second staircase generator 120. The staircase generator 120 is operatively connected to the staircase generator 106 such that every time the staircase generator 106 reaches its maximum count and returns back to its lowest level or step to recount, the staircase generator 120 increases from one discrete voltage level or step to a higher discrete voltage level or step. The staircase generator 120 may have $2^7$ steps or levels, and applies the staircase output voltage by its output line 122 to a vertical deflection amplifier 124. The vertical deflection amplifier 124 serves the function of amplifying the output of the staircase generator 120 to deflect the electron beam in a vertical position and in an amount proportional to the output voltage received from the staircase generator 120. Each time the staircase generator 120 rises from one discrete voltage level or step to a second discrete voltage level or step, the vertical deflection control 88 deflects the electron beam in the vertical direction to an adjacent track. The number of steps in the staircase generator 120 being representative of the number of tracks on the drum to be engraved. Thus, between the operation of the vertical deflection control 88 and the horizontal scanning control 116, the electron beam position can be specifically controlled and the scanning rate thereof synchronized with the rotation of the drum.

The control of the state of the beam, that is whether the beam is on or off, is determined by the coincident circuit generator control 86. Coincident control line 114 applies the output of the beam scanning control 102 to a flip-flop 126 such that the flip-flop is driven into a set condition. Prior to the flip-flop receiving an output from the beam scanning control, the flip-flop is in the reset position. When the flip-flop 126 is driven into the set condition, via coincident control line 114, an output 128 from the flip-flop 126 starts the beam intensity control 130. The beam intensity control 130, via line 132, modulates the intensity of the electron beam being generated by the beam generator. The output from the flip-flop 126 is also applied to a line 133, via output 128, to the beam generator control programming means 90. Line 133 transmits to the programming means 90 that the flip-flop has been set and that the electron beam is in the on position and scanning. The programming means 90 includes means to allow the electron beam to remain in the on position for a predetermined length of time whereupon the programming means 90 sends a stop signal back to the flip-flop 126 via line 134. The stop beam line 134 resets the flip-flop 126 thereby terminating the operation of the electron beam via beam intensity control 130. Additionally, the stop beam line 134 is connected to a scanning reset line 135. Scanning reset line 135 is connected to the horizontal scanning control 116 of the beam scanning synchronization unit 84. When the programming means 90 sends a stop signal back to the flip-flop 126, the scanning reset line 135 carries the stop beam signal to the horizontal scanning control 116 to return the horizontal beam deflection control back to quiescent for the next operation. Thus the beam operation is terminated by the programming means 90 and is returned to its quiescent state so that the electron beam is in position to start another cycle and remain in synchronism with the rotating drum.

In FIGURE 5 is shown an embodiment of the invention wherein a facsimile copy or a letter-press cylinder 140 is produced from a master. Cylinder 140 is mounted in an evacuatable chamber 142 within housing 144. An electron gun assembly herein designated in its entirety by the box 145 generates an electron beam 146 which, by means of an appropriately mounted combined focusing deflection coil assembly 148 is caused to circumferentially scan a segment of the cylinder 140.

The cylinder 140 is mounted on shaft 150. In turn, shaft 150 is journalled in sealed bearings 152. Housing 144 is adapted to be evacuated through a port 154 by appropriate connection (not shown) with a conventional vacuum pumping system 156.

Housing 144 is evacuated during beam operation as is customary when using an electron beam.

Adjacent housing 144 and mounted on an extension of shaft 150 for similar rotational movements is a drum 158. On the peripheral surface of drum 158 is positioned a preformed image pattern (not shown) such as a photograph print composition or the like which is to be reproduced on the letter-press cylinder 140.

A flying spot scanning device 160 is positioned over the drum 158. The device employs a cathode ray tube 162, and a lens 164 which focuses the output from the cathode ray tube 162 to a point 165 at the surface of the cylinder 158. A photo multiplier tube 166 collects light emission from the point 165. The entire flying spot scanner assembly 160 is suspended from a screw feed shaft 168. When the screw feed shaft 168 is driven at a constant r.p.m. by a motor 170, the flying spot scanner assembly 160 moves axially relative to the surface of the drum 158.

Observe that the shaft 150 is rotated by means of a motor 172 and the motors 170 and 172 are interconnected by means of a conventional motor speed control herein designated in its entirety by the numeral 174 so as to cause the motor 170 and motor 172 to operate at the same relative r.p.m. to insure that the rotation of the cylinder 140 and drum 158 will be matched with the rotation of the screw 168.

The output from the photo multiplier tube 166 is fed to beam generator control 176. This control 176 produces an output which is fed to the control element of the electron gun 145. The beam generator is ultimately used to control the on-off time sequence for the beam 146. During the time when the beam is on, it is caused to scan the surface of cylinder 140 by an appropriate voltage impressed upon coil assembly 148. The voltage impressed on coil assembly 148 is produced and controlled by the scanning control synchronization unit 180. Synchronization unit 180 itself is regulated by the speed of rotation of shaft 150 using the disc 182 and an appropriate sensing element 184 mounted over the perimeter regions of disc 182. The entire assembly of disc 182 and sensing element 184 are to be constructed appropriately as described above in connection with FIGURES 3 and 4. The output of sensing element 184 is fed to the synchronization unit 180 to control the synchronization pulses produced therefrom. In addition to controlling coil assembly 148, the output from the synchronization unit 180 is used to control the scan rate of the cathode ray tube 162 in the flying spot scanner assembly 160. Thus, the scan rate of the beam 146 matches the scan rate of the beam produced by the flying spot scanner 160. Observe that beam 146 pursues a spiral track on drum 140 and that flying spot scanner assembly pursues a similar track on drum 158.

The intensity of the beam 146 and the r.p.m. of the shaft 150 are so interrelated that the thermal energy released by the beam on the surface of the cylinder 140 is sufficient to effect local melting of the surface of cylinder 140 and the rate of angular movement of the surface of cylinder 140 is such as to throw off by centrifugal force the metal so melted. The rate of scanning by the beam 146 over the surface of the cylinder 140 is such that the beam scan rate matches that of the velocity of the surface of the cylinder 140 so that the beam point appears to be stationary on the surface of the cylinder 140 during a scan.

Variations in the amount of metal removed from the surface of cylinder 140 are achieved so as to produce a gray scale or half tone image on the surface of cylinder 140. One method of achieving this variation is by using a beam of constant intensity but allowing the beam to scan for a shorter period. Thus a beam beginning at its starting point only scans such portion of a predetermined maximum sector as is necessary to remove sufficient metal to reproduce a desired gray scale in the finished plate corresponding to the original image on the surface of the drum 158. The video signal obtained from the photomultiplier in the facsimile embodiment shown in FIGURE 5 must be fed into a suitable beam generator control programmer if the beam which is utilized in actual creation of a cavity on drum 140 is of constant intensity nature in order to obtain the desired beam on time in every instance. If the beam is intensity modulated, the signal can be fed directly to the beam generator control 176 for ultimate transmittal to the control element of the electron gun 145.

The variation in the amount of metal removed may also be achieved by the use of an electron beam of variable intensity over a constant scan length. Thus for half tone effects the intensity of the beam is decreased suitably.

In FIGURE 5 it will be appreciated that, as the flying spot scanning unit 160 moves axially of the drum 158, the electron gun assembly 145 and its associated coil 148 similarly move longitudinally of the cylinder 140. This movement is achieved by means of a shaft 186 which interconnects the flying spot scanner unit 160 with gun 145 and coil assembly 148 as shown. Cylinder 140 and drum 158 are so chosen that each has substantially the same diameter. Seals 188 prevent air leaks from the atmosphere through housing 144 during sliding movement of the shaft 186.

The temperature of the cylinder 140 is conveniently preheated uniformly by heating elements (not shown) which are positioned internally of the cylinder 140. Such preheating means that less energy from the beam 146 is needed to melt the surface of cylinder 140 and also aids in producing high quality images on the surface of cylinder 140. Instead of using internal heating coils, one can employ high frequency radio wave radiation, fluid circulation within the cylinder 140 (for example, liquid sodium at 500° F.) or the like.

In FIGURES 6 and 7 are shown the appearance of spiral track for the beam on the surface of a cylinder. Here the beam traverses the length of a cylinder using the predetermined point mode of operation so that a plurality of spaced points are created on the surface of the cylinder. Then a second track is commenced and by an appropriate step generator the beam is caused to pursue the same spiral path as before except that during the second cycle the beam is adjusted so as to produce crater-like spot having its center one diameter removed from the center of the first crater-like spot. A third sequence is similarly laid down and the process is continued until a spirally-shaped continuous line of crater-like dots is produced. The appearance of a completed spiral track in an engraving operation within the scope of this invention is shown in FIGURE 7.

In the embodiment of FIGURE 5, it is desirable, especially for high-quality engraving, to incorporate with the synchronization control some means of minimizing the problem of skew effects which tend to occur during the spiral engraving of a track on a drum surface 140.

Skew effects may be understood by reference to the graphical presentation of FIGURE 12 wherein the abscissa is indicated by arrow $a$ and the ordinate by arrow $b$. The abscissa corresponds to the circumferential direction of a drum while the ordinate corresponds to the axis of a drum, such as drum or cylinder 140. A preferable track configuration is indicated by track $T_1$ in FIGURE 12. However, due to the fact that the electron gun 144 is moved perpendicularly to the length of the rotating drum 140, there is encountered a skew having the general pattern indicated in track $T_2$ of FIGURE 12. This skew problem occurs from the fact that a first spot or cavity 300 on track $T_2$ of FIGURE 12 is laid down on the surface of the drum 140 a finite period of time before a spot 364 is laid down. There is a resulting displacement in the vertical axis of the track $T_2$ between spot 300 and spot 364 caused by the motion or displacement of the electron gun perpendicularly to the axis of the drum 140. The drum 140 is revolving at a constant rate, and the information implanted on drum 140 is laid down in discrete sectors or subtracks around the periphery of the drum 140.

In order to compensate for this time discrepancy, a signal has to be imparted into, for example, the vertical deflection coil of the yoke assembly associated with an electron beam source used for engraving so as to bring the spot 364 into alignment with spot 300.

The synchronizing means of FIGURE 4 can be used to correct such skew effect by utilizing the signal generated in staircase generator 106 of FIGURE 4 and the skew compensating circuit shown as an alternative construction in FIGURE 4. In this alternative embodiment (used when a spiral track is being employed) the signal from generator 106 is fed into a suitable amplifier 302, the output of which would be fed into a gain control device 304 (such as a conventional gain potentiometer pot known to those who are familiar with this art). The output of device 304 allows one to vary the vertical deflection capabilities of the deflection assembly associated with an electron gun used for engraving. The output from gain control device 304 is fed to a vertical deflection amplifier 124' and finally to the vertical yoke coil of the deflection assembly in an electron gun. The result is that one compensates for the time discrepancy between spot 300 and spot 364 in the first sector of track $T_2$ of FIGURE 12.

With the addition and utilization of this skew compensating circuit 306 one obtains a resulting track configuration similar to that indicated $T_3$ of FIGURE 12. Track $T_3$ bears a desired great degree of similarity to the track $T_1$. If there are discontinuities (as indicated in track $T_3$ of FIGURE 12), they are caused by a number of factors, for example, minor irregularities in timing signals from the revolution synchronization means (for example, disc 70 of FIGURE 4).

In FIGURE 7 the segments are so chosen that sectors of three spot diameter are employed. Thus during the first track the dots 190 are laid down. During the second spiral tracking operation the spots 192 are laid down or created. Finally, to complete the track in this illustration an additional spiral track is pursued so that the spots (craters) 194 are created. It will be appreciated that the cross-section used in FIGURE 7 is employed for illustrative purposes only and does not depict any actual sectioning.

The appearance of a single crater-like hole 315 is depicted in FIGURE 9. Hole 315 illustrates the appearance of a crater produced in accordance with the apparatus and method of the present invention using a single beam and the mode of operation illustrated in FIGURES 3, 4 and 5.

FIGURE 8 is an illustration of the second mode in which the present invention can be practiced. In this mode a controlled beam (optionally stationary and/or modulated) of appropriate high energy is allowed to continuously scan the surface of a revolving cylinder of metal or the like. The illustration here is in the form of a continuous spiral track and the beam is unmodulated i.e. of constant intensity) so that there is produced a spirally shaped groove which traverses the surface of the cylinder.

Owing to the limited ability usually associated with a yoke to deflect an electron beam through but a limited number of degrees from the beam axis, it is usually desirable to have the beam generator unit and associated parts adapted to move axially along the surface of the cylinder. Thus, in FIGURE 10, is depicted a modified portion of the device shown in FIGURE 3 wherein the entire electron gun assembly 200 is suspended from a suitable framework 201 and this framework 201 is in turn suspended from a screw 202. Screw 202 is caused to rotate by means of a motor 204 and gear box 206. The speed of rotation of motor 204 is synchronized with that of the drive motor 215 (FIGURE 3) by means of a motor speed control unit 208. Such an arrangement eliminates the need for a vertical yoke coil to deflect the beam axially of cylinder 210. Only a yoke coil assembly 212 which will focus the beam 211 and cause it to scan in a circumferential direction relative to the cylinder 210 is needed. Cylinder 210 is driven by motor 215 operating on shaft 218 through gear box 220. Other portions of the FIGURE 3 apparatus remain substantially as described in FIGURE 3.

In view of the foregoing discussion, it will be appreciated that the method for engraving a pattern upon peripheral surfaces of a generally cross-sectionally circularly shaped body in accordance with the teachings of this invention involves rotating a suitably shaped body upon an axis at a velocity sufficient to remove by centrifugal force loosened peripheral local surface portions thereof while simultaneously directing against said surface a controllably generated and modulated beam of sufficient high energy to effect local loosening of said peripheral surfaces upon exposure thereof to such beam, the relationship between the modulation of said beam and the velocity of rotation of said body being such as to produce removal of predetermined portions of such peripheral surfaces so as to produce a desired engraving pattern thereupon.

While the present invention has been illustrated by reference to certain specific embodiments and descriptions, it will be appreciated that modifications thereof can be readily accomplished without departing from the spirit and scope of this invention: For example, a plurality of high energy beams can be employed to engrave a single cylinder, the beam generating means can be caused to orbit about the cylinder so as to achieve desired beam scan characteristics, and various combinations of intensity modulation plus scan rate or duration can be used to govern beam characteristics for particular surface locations during engraving. Observe that the beam generator control programming means 90 in FIGURES 3 and 4 utilizes information either internally stored or externally supplied. Conventional information storage and retrieval systems can be used in conjunction with the beam generator control programming means 90. For example, those skilled in the art will appreciate the electronically coded information can be stored and retrieved by such systems as digital tape transport means with associated electronic decoding and character generation circuits using stored graphic material, such as microfilm. Thus, if microfilm is used, images can be projected and viewed conveniently by a conventional Videcon tube and the resulting electrical signals so generated used to modulate and control, ultimately, the beam used for engraving in accordance with the teachings of this invention.

A description of a synchronizing means for interconnecting the rotating means and the beam generating and controlling means appears in copending application S.N. 22,755, filed on even date herewith in the name of Richard L. Paidosh.

The claims are:

1. An apparatus for engraving a generally cross-sectionally circularly shaped body having peripheral surfaces which are generally capable of being locally selectively loosened upon the application thereto of sufficient localized high energy comprising (a) means for rotating a said body upon an axis at a velocity sufficient to remove by centrifugal force loosened peripheral local surface portions of a said body, (b) means for controllably generating, modulating, and directing a beam of sufficient high energy to effect local loosening of said peripheral surfaces upon exposure thereof to such beam, and (c) means interconnecting said rotating means and said beam generating, modulating, and directing means to maintain a predetermined programmed interrelationship therebetween to produce selected local local loosening of predetermined surface portions of a said body.

2. An apparatus for engraving comprising (a) a generally cross-sectionally circularly shaped body having peripheral surfaces which are generally capable of being locally selectively loosened upon the application thereto of sufficient localized high energy, (b) means for rotating said body upon an axis at a velocity sufficient to remove by centrifugal force loosened local portions of said peripheral surfaces, (c) means for controllably generating, modulating, and directing a beam of sufficient high energy to effect local loosening of said peripheral surfaces upon exposure thereof to such beam, and (d) means interconnecting said rotating means and said beam generating, modulating, and directing means to maintain a predetermined programmed interrelationship therebetween to produce selected local loosening of predetermined surface portions of said body.

3. An apparatus for engraving comprising (a) a framework, (b) a generally cross-sectionally cylindrically shaped body having peripheral surfaces generally capable of being locally selectively loosened upon the application thereto of sufficient localized high energy, (c) means functionally associated with the same framework for rotating said body upon its axis at a constant velocity in predetermined relationship to said framework, said means including a powerhead, said constant velocity being sufficient to remove by centrifugal force loosened local portions of said peripheral surfaces, (d) stationary means functionally associated with said framework for controllably generating and modulating a beam of sufficient high energy to effect local loosening of said peripheral surfaces upon exposure thereof to such beam, said means being further adapted to cause said beam sequentially first to scan a predetermined segment, then blank, return, and finally rescan said segment, said segment being so positioned as to subtend circumferentially said body, (e) means functionally interconnecting said rotating means and said beam generating means so that a predetermined velocity interrelationship can be maintained between beam scan rate and a prechosen point on said peripheral surfaces so that, while said body is rotating, said beam can rest on said prechosen point during the time when said prechosen point is within said segment, said time being sufficient to produce local loosening of a predetermined portion of the surface of said body, and (f) means for controllably axially moving said beam relative to said body so as to adapt said beam to strike successive adjacent prechosen points during successive beam scans.

4. An apparatus for surface engraving comprising (a) a framework, (b) a generally cross-sectionally cylindrically shaped body having side wall surfaces generally capable of being locally selectively loosened upon the application thereto of sufficient localized high energy, (c) means functionally associated with said framework for rotating said body upon its axis at a constant velocity in fixed relationship to said framework, said means including a powerhead, said constant velocity being sufficient to remove by centrifugal force loosened local portions of said side wall surfaces, (d) stationary means functionally associated with said framework for controllably generating a beam of high energy, said means being further adapted to cause said beam sequentially first to scan a predetermined segment, then blank, return, and finally rescan said segment, said segment being so positioned as to subtend circumferentially said body, (e) means for controllably moving said beam circumferentially relative to said side wall surfaces, (f) means functionally interconnecting said rotating means and said beam generating means so that a predetermined velocity interrelationship can be maintained between beam scan rate and a prechosen point on said side wall surfaces so that, while said body is rotating, said beam can rest on said prechosen point during the time when said prechosen point is within said segment, said time being sufficient to produce local loosening of a predetermined portion of the surface of said body, and (g) means for controllably axially moving said beam relative to said body so as to adapt said beam to strike successive adjacent prechosen points during successive beam scans.

5. A method for engraving a pattern upon peripheral surfaces of a generally cross-sectionally circularly shaped body, said surfaces being generally capable of being selectively loosened locally upon the application thereto of sufficient localized high energy, said method comprising the steps of rotating a said body upon an axis at a velocity sufficient to remove by centrifugal force loosened peripheral local surface portions thereof while simultaneously directing against said surface a controllably generated and modulated beam of sufficient high energy to effect local loosening of said peripheral surfaces upon exposure thereof to such beam, the relationship between the modulation of said beam and the velocity of rotation of said body being such as to produce removal of predetermined portions of such peripheral surfaces so as to produce a desired engraving pattern thereupon.

6. Apparatus for engraving a generally cross-sectionally circularly shaped body with a corpuscular beam comprising means for directing said corpuscular beam at said body to at least melt localized portions of said body;

means operatively connected to and adapted for rotating said body along an axis while said corpuscular beam melts said localized portions of said body, said rotating means rotating said body at a peripheral velocity sufficient to remove said melted localized portions from said body by centrifugal force; and programming means operatively coupled to said directing means and said rotating means for selectively directing said corpuscular beam at discrete localized portions on said body and for controlling said rotating means for maintaining said body at said sufficient velocity to continually remove melted localized portions of said body to produce an engraved body.

7. A method for engraving a generally cross-sectionally circularly shaped body with a corpuscular beam comprising the steps of directing a corpuscular beam at said body to at least melt localized portions of said body;

concurrently rotating said body along an axis while said beam is directed at and melts localized portions of said body at a peripheral velocity sufficient to remove said melted localized portions by centrifugal force;

selectively positioning said corpuscular beam at discrete localized portions on said body; and maintaining said rotating body at said sufficient velocity to continually remove the melted portions therefrom to produce an engraved body.

References Cited

UNITED STATES PATENTS

| | | | |
|---|---|---|---|
| 2,870,250 | 1/1959 | Boyajean | 178—6.6 |
| 2,925,463 | 2/1960 | Hell | 178—6.6 |
| 3,192,318 | 6/1965 | Schleich et al. | 219—121 |
| 3,246,079 | 4/1966 | Teucher | 219—121 |
| 3,259,730 | 7/1966 | Wehde et al. | 219—121 |
| 3,293,587 | 12/1966 | Robinson | 219—121 |
| 3,301,949 | 1/1967 | Ullery | 219—121 |
| 3,308,264 | 3/1967 | Ullery | 219—121 |

RICHARD A. WOOD, *Primary Examiner.*

W. D. BROOKS, *Assistant Examiner.*